US006052423A

United States Patent [19]
Blois et al.

[11] Patent Number: 6,052,423
[45] Date of Patent: Apr. 18, 2000

[54] SYNCHRONIZATION AND TRACKING IN A DIGITAL COMMUNICATION SYSTEM

[75] Inventors: Gary Vincent Blois, Towaco; Joseph Michael Fine, West Caldwell, both of N.J.; Marvin A. Epstein, Monsey, N.Y.

[73] Assignee: ITT Manufacturing Enterprises, Inc., Wilmington, Del.

[21] Appl. No.: 09/349,077

[22] Filed: Jul. 8, 1999

Related U.S. Application Data

[63] Continuation of application No. 08/837,353, Apr. 17, 1997, Pat. No. 6,002,728.
[51] Int. Cl.[7] ....................................................... H04L 7/00
[52] U.S. Cl. .......................... 375/355; 375/326; 375/368; 375/369
[58] Field of Search ..................................... 375/325, 326, 375/343, 354, 355, 362, 368, 369; 370/509, 512, 514

[56] References Cited

U.S. PATENT DOCUMENTS

| | | | |
|---|---|---|---|
| 5,333,150 | 7/1994 | Ketterling | 375/324 |
| 5,544,200 | 8/1996 | An . | |
| 5,550,869 | 8/1996 | Gurantz et al. | 375/340 |
| 5,629,956 | 5/1997 | Durrant et al. . | |
| 5,671,257 | 9/1997 | Cochran et al. . | |
| 5,694,441 | 12/1997 | Suzuki . | |
| 5,727,035 | 3/1998 | Hiramatsu . | |
| 5,844,920 | 12/1998 | Zook et al. | 714/769 |
| 5,859,671 | 1/1999 | Kim . | |
| 5,870,443 | 2/1999 | Rahnema . | |
| 5,878,079 | 3/1999 | Mori . | |
| 5,878,088 | 3/1999 | Knutson et al. . | |
| 5,883,920 | 3/1999 | Maruyama et al. . | |

Primary Examiner—Young T. Tse
Attorney, Agent, or Firm—Saul Elbaum

[57] ABSTRACT

There is disclosed a bit sync search and frame sync search system operative with a digital data signal as transmitted by a digital radio transmitter. The bit search is implemented by detecting a predetermined phasing signal which is incorporated in the digital signal and which has a repetitive bit pattern of ones and zeroes. The phasing signal is first detected by providing an in-phase and quadrature component signal and correlating those signals to provide an output signal indicative of the bit pattern in the phasing signal. After the phasing signal has been provided and an oscillator associated with a receiving apparatus is compensated according to the detected phasing signal, a tracking mode is entered, whereby a frame signal is captured and the system generates histograms of data bit transitions for producing an error signal indicative of the difference of the transmitted clock rate and the sampling portion of a received bit. In this manner, by adjusting the clock according to the error signal produced by the histogram process one can be assured that the sampling rate at the receiver will occur relatively at the center of each bit to therefore provide reliable decoding or detection of the received digital data signal in the presence of the noise.

30 Claims, 10 Drawing Sheets

FIG. 2

| FRAME n-1 | FRAME n | FRAME n+1 |
|---|---|---|
| | 1) ACCUMULATE 80 RFNR FMDEMOD SAMPLES, Xn, FOR FRAME n (THIS FRAME) TO BY USED FOR RAW CORRELATIONS<br><br>2) PERFORM RAW CORRELATIONS (FOR FRAME n-1, THE PREVIOUS FRAME):<br><br>$COR\_I = UW[\sum_{j=1}^{80} (X_{j,n-1} * I_j * 2^{-6})]$   SP<br><br>$COR\_Q = UW[\sum_{j=1}^{80} (X_{j,n-1} * Q_j * 2^{-6})]$   SP<br><br>3) COMPUTE PARTIAL POWER FOR FRAME n-1<br><br>$PPWR = \sum_{j=1}^{80} (X_{j,n-1}^2 * 2^{-6}) * 2^{-6}$   DP<br><br>4) COMPUTE SUM OF CORRELATIONS AND SIGNAL POWER OVER M PREVIOUS FRAMES, ALSO COMPUTE TOTAL POWER OVER M PREVIOUS FRAMES<br><br>$I_{SUM} = UW \sum_{p=n-M}^{n-1} (COR\_I_p * K)$;   K=16,384<br><br>$Q_{SUM} = UW \sum_{p=n-M}^{N-1} (COR\_Q_p * K)$<br><br>$SIGPWR = (I_{SUM}^2 + Q_{SUM}^2)$<br><br>$TPWR = \sum_{p=n-M}^{N-1} PPWR_p$ | |
| | 5) DETECTION TESTS:<br><br>STORE $I_{SUM}(n)$ & $Q_{SUM}(n)$<br><br>UPDETECT =<br>SIGPWR - MAX(TPWR, THRESHPWR);  DP<br><br>IF UW[UDETECT(n-1) > 0<br>  NUMCSCDET = NUMCSCDET+1<br>IF NUMSCDET > DETMAX<br>  DECLARE 'DETECT'<br>END IF<br>  IF UW[UDETECT(n-1)] > UW[UDETECT(n)]<br>DECLARE 'DETECT'<br>  END IF<br><br>6) DETECTION DECLARATION TEST:<br>IF<br>  DETECTION IS DECLARED<br>  INVOKE JAM SYNC LOGIC<br>  USING STORED $I_{SUM}, Q_{SUM}$<br>END IF | |

1 MILLISECOND
EIGHT CYCLES OF 8KHz IN
1 MILLISECOND

FIG. 4A

| FRAME n-1 | FRAME n | FRAME n+1 |
|---|---|---|
| | 1) ACCUMULATE 80 RFNR FMDEMOD SAMPLES FOR FRAME n (THIS FRAME) TO BE USED FOR RAW CORRELATIONS<br><br>2) PERFORM RAW CORRELATIONS (FOR FRAME n-1):<br><br>$\quad I^{n-1}$<br><br>$\quad Q^{n-1}$<br><br>3) PERFORM DATA BIT DECISIONS<br><br>4) USE DETECTED DATA BITS FOR TRANSEC CORRELATION SEARCH PROCESS<br><br>5) TIME OUT TEST<br><br>$\quad$ IF $\quad$ TIME OUT EXPIRED<br>$\quad$ THEN $\;$ TRANSITION TO STATE A<br>$\quad$ ELSE $\;\;$ CONTINUE<br><br>6) TRANSEC FRAME SYNC DETECT:<br><br>$\quad$ IF $\quad\;\;$ TRANSEC FRAME SYNC DETECT<br>$\quad$ THEN $\;$ TRANSITION TO STATE C<br>$\quad$ ELSE $\;\;$ CONTINUE | |

SYNCHRONIZATION AND TRACKING IN A DIGITAL COMMUNICATION SYSTEM

CROSS REFERENCE TO RELATED APPLICATION

This application is a continuation application of U.S. patent application Ser. No. 08/837,353, entitled "Synchronization and Tracking in a Digital Communication System", filed Apr. 17, 1997, now U.S. Pat. No. 6,002,728. The disclosure of the foregoing patent application is incorporated herein by reference in its entity.

This invention relates to digital communication systems and more particularly to a digital radio system including apparatus for providing sync detection to allow synchronization and tracking of the transmitted digital signals.

BACKGROUND OF THE INVENTION

Digital radio for carrier telephony appeared in the early 1970's and was limited to modest spectral efficiencies and relatively short distances. The field has greatly grown over the past decades and the use of digital radio is widespread. In order to increase the efficiency of digital radio, digital engineers have raised the number of modulation levels and have generally dealt with modulation/demodulation techniques, spectral shaping and synchronization schemes. This has led to widespread and more efficient use of the digital radio systems.

As one can ascertain, a major problem in the transmission of digital data signals is interference due to noise. Hence, noise, in any communication system, plays an important part in the design and operation of the system. For general background on digital radio and particularly for microwave operation, reference is made to a text entitled *Microwave Digital Radio* edited by Larry J. Greenspan and Mansoor Shafi and published by the IEEE Press, the Institute of Electrical and Electronic Engineers, New York (1988).

During the past decade, many improvements have been implemented involving advanced digital radio techniques. Digital radio is used both commercially and for the military. As one can ascertain in dealing with digital data transmission, as data generated by computer systems and so on, one has to be extremely careful in processing the information so that the desired bits and the content of the bit patterns are easily recognized and decoded.

In order to do so, many systems operate with a synchronization system where a bit sync pattern is generated by the transmitting system and is detected by the receiving system. This bit sync pattern, once accessed at the receiver, synchronizes the receiver's clocks so that all incoming digital data is sampled at the proper time and at the proper interval. This is extremely important in the transmission of digital data as compared to voice data, as voice data is just received, processed and listened to. As one can ascertain in regard to digital data, if the clock at the receiver drifts with respect to the transmitting clock then the data can not be properly decoded and processed.

Thus, a major specification of such systems is the reliable processing of digital data by performing the retrieval of a transmitted synchronization signal and then utilizing that signal to synchronize the clock or the timing generators at the local receiver. This is a common problem in communication systems of all kinds, and is particularly important in the formulation of digital data.

Nearly all microwave digital radio systems use linear modulation or those that are formed by translating base band pulse streams to IF or RF using balanced amplitude modulators. The principle of linear modulation is well-known and inputs I and Q represent sequences of data values in digital forms, with data values in each stream separated by T seconds. The systems use digital to analog and analog to digital converters which change the data streams into appropriate formats. The systems use a local oscillator which produces a sinusoidal carrier where it is applied to balanced modulators to provide the I and Q signals. Demodulators also utilize balanced circuits to demodulate the signal which is eventually applied to AD converters and which AD converters are sampled at a system sampling rate. Such digital signals are well-known and such digital systems are also well-known. In order to synchronize the transmit and receive data, phasing signals are employed to provide bit sync, and framing signals are employed to provide frame sync.

It is extremely desirable in all systems to synchronize the receiver clock with the transmitting clock so that sampling can be performed preferably at the center of the data bit to assure reliable decoding and to prevent noise from interfering with the retrieval of data at the receiver.

This is important in the transmission of digital data as compared to the transmission of voice. As indicated, such techniques are well-known including techniques for generating digital sequences and various methods for retrieving sync and framing data. This application relates to some novel approaches to generate and retrieve the sync data as well as frame sync by utilizing digital processing techniques as will be further explained.

It is therefore an object of this invention to provide an improved system operative with a digital radio or communication system which enables one to synchronize and maintain synchronization during a transmission between a transmitter and a receiver.

SUMMARY OF THE INVENTION

In a digital communications system having a transmitter for transmitting a digital data signal via a noisy transmission path, said signal having a phasing signal portion and a framing signal portion manifested by a repetitive bit pattern of ones and zeroes and used to synchronize a clock at a receiver responsive to said transmitted signal for receiving the same comprising means responsive to said phasing signal to provide an I and Q component and for correlating said components to provide an output signal indicative of the bit pattern in said phasing signal; tracking means responsive to said output signal and said receiving signal for periodically providing histograms of data bit transitions for producing an error signal indicative of difference of the transmitted clock rate and the sampling position of a received bit; and a clock means responsive to said error signal to provide a clock signal according to said error signal to enable sampling of received data bits relatively at the center of each bit.

BRIEF DESCRIPTION OF THE DRAWINGS

FIG. 2 is a diagram showing the threshold procedure implemented on a per frame basis.

FIG. 4A is a TRANSEC frame search state chart.

DETAILED DESCRIPTION OF THE INVENTION

Figure 1:
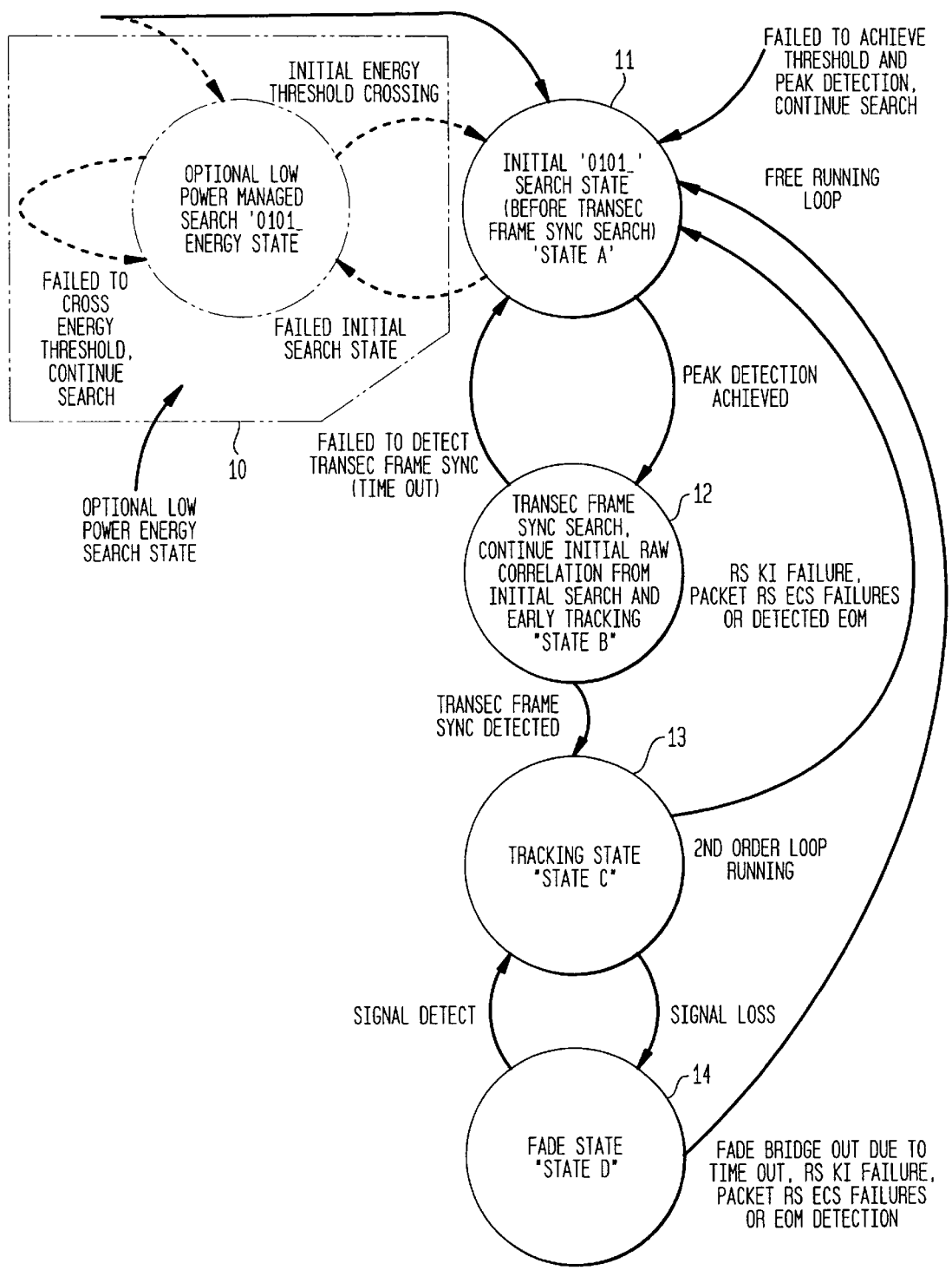
FIG. 1 is a bit sync state transition diagram.

Before going into detail explaining the nature of the invention the following should be understood. This invention relates to digital radio communications which as indicated is used both commercially and by the military. In military digital communications, certain systems use what is referred to as a Fixed Frequency Cipher Text signal (FF-CT). Such a cipher text transmission is sometimes referred to as a TRANSEC communication system. TRANSEC stands for the acronym "transmission security system". The exact nature of the digital signal is not necessary for an understanding of the operation of the present invention. A digital signal, as one can ascertain, is modulated on a microwave or other carrier and consists of a plurality of ones and zeroes which can comprise a data portion, a sync portion, and so on. Such signals may also be preceded by a bit synchronization portion which normally involves a pre-determined pattern indicative of a synchronizing or phasing pattern which is necessary for the receiver to accurately receive and respond to the transmitted signal.

From the earliest days of digital radio, linear modulation formats have been employed almost exclusively. Thus, regardless of the number of modulation levels, the modulators and demodulators in such systems can always be modeled as a form of QAM, quadrature amplitude modulators. The quadrature amplitude modulator is a very well-known component and operates to perform modulation by utilizing a carrier that is 0° in phase as applied to a first mixer and 90° out of phase as applied to another mixer or modulator. These are normally referred to as quadrature amplitude modulators and are widely employed in digital radio receivers. As one can ascertain, the number of modulation levels can vary greatly and such systems using 256 or more modulation levels have been utilized. The present invention involves the detection of a digital bit sync format. The goal of the initial bit sync search is the detection of the data phasing signal which in many systems is a known and a repetitive pattern. In particular, in such digital radios utilized for the military, as for example employing the above FF-CT signal, such a phasing signal pattern is specified. The phasing signal has a total of 256 bits in a "1010 . . ." pattern. Initial bit sync has to be acquired by such a receiver by the end of the phasing signal with a probability of 99.5 at a 10% error rate (BER).

The phasing signal is usually followed by a frame sync pattern. Following detection of phasing the system, to be described, initiates a frame sync pattern search. The raw correlation function of bit sync acquisition is maintained until there is a frame sync detection. If there were a search failure, followed by a false bit alarm, such systems would resume the initial bit sync search. Since the false alarm may have immediately preceded an actual phasing signal, and for related reasons, the system processing includes a buffer where the most recent 256 samples are stored for reference. If the frame sync search is successful, the system changes to a tracking or synchronization maintenance state. As one can see, the main aspect of the system receiver is to make sure that the receiver's clock or timing reference source is synchronized to the transmitter's clock so that the digital data contained in the digital signal can be accurately and reliably decoded or demodulated.

Referring to FIG. 1 there is shown a bit sync state transition diagram which is useful in explaining the operation of the search and acquisition algorithm as utilized in performing the initial bit sync search or detection. Before proceeding, as an example, we will assume that the data rate is 16 KB/sec, and therefore the "1010 . . ." phasing signal has nearly all its energy at 8 KHz. If the bit rate were 32 KB/sec then a phasing signal having a 101 pattern would have nearly all of its energy at 16 KHz and so on. Thus, the phasing signal is an 8 KHz square wave that has a strong 8 KHz fundamental (sinusoid) and weak odd harmonics. Filtering at the transmitter and receiver attenuates the higher harmonics even further. The algorithm uses analog in-phase and quadrature phase raw correlators. These correlators are referred to as the I, which is the in-phase correlator, and the Q which is the quadrature phase correlator. Such correlators are well known. Thus the raw correlators are 1 msec. in length which is an interval equivalent to 16 bits. The correlators are matched to 8 cycles to an 8 KHz sine or cosine (sinusoidal) waveform (see FIG. 9). The correlator output sampling rate is 1 KS/sec, i.e. once per millisecond. The term KS stands for kilo samples. A programmable length, "n" of sequential samples of both the I and Q channel raw correlator outputs (i.e., 5 to 8 frames or millisecond sequential samples) are combined to form a final energy estimate of the received signal. The 1 msec. raw correlators are implemented as 80-tap FIR filters. The input sampling rate is 80 KS/sec and the output sampling rate is 1 KS/sec i.e., the filter is decimated by 80. The raw correlator filters are defined by the following coefficients:

| | | |
|---|---|---|
| $h_{cos}(n)$ | $= \cos(n*pi/5);$ | (n = 0 to 79) |
| $h_{SIN}(n)$ | $= -\sin(n*pi/5);$ | (n = 0 to 79) |

The final energy estimates are computed every 1 msec as follows:

1. Accumulate 80 samples per each 1 msec (@ 80 KS/sec).
2. Compute the latest raw Inphase and Quadrature correlations.
3. Sum the 'n' most recent Inphase correlation samples.
4. Sum the corresponding 'n' Quadrature correlation samples.
5. Find the sum of the squares of the I and Q channel sums.
6. Compute a power measurement per each 1 msec period (@80 KS/sec).
7. Compute total power measurements over the 'n' most recent frames.
8. Compare the signal energy estimate to the total power for a relative threshold measurement.
9. If energy estimate exceeds the relative threshold and 'peaks', calculate bit phase, adjust the bit edge sample pointer and the rubber clock, and start the TRANSEC search.

10. Else, if the relative threshold is not exceeded, continue Search (Step 1).

Referring to FIG. 1, there is shown the sync state transition diagram which implements the bit sync search. Reference numeral '10' refers to a module which is enclosed in dashed lines and indicated as an optional low power energy search state. What occurs during actual system operation is that one, depending on the magnitude of the received signal, can determine whether the signal contains a sufficient value of energy to implement or warrant continuation or start of the search. Framing signals may just be noise and therefore are completely random or may be "low energy" signals incapable of being processed. Thus, the initial search as indicated will look for the bit synchronization pattern which is 0101. As shown by module 11 in the state diagram, the initial search state before the transmission security occurs enters a state A where one accumulates 80 samples during a 1 msec period and then proceeds to compute the inphase and quadrature correlations. The raw correlation from the initial search and early tracking stages are made. Once the correlation samples are summed and once the power measurement is made, the comparisons are made to the signal energy estimate to the total power for providing a threshold measurement. If this threshold measurement is exceeded by the signal then the actual bit phase of the clock is calculated and the bit edge sample is adjusted. If the energy states are not made, the various aspects of the program as indicated by modules 13 and 14 do not occur and the sync search continues. This is indicated by the state diagram of FIG. 1 as for example by the arrow shown coupled to module 11 indicating "Failed to Achieve Threshold and Peak Detection, Continue Search". The search state procedure is a free running loop which continues to search for the bit sync pattern before a frame sync search is implemented.

Referring to FIG. 2, there is shown a complete procedure which occurs per frame in order to implement the above described operation as shown in the state diagram of FIG. 1. FIG. 2 describes in greater detail what occurs during each of the frames, as for example frame n, in order to detect the data phasing signal. As one can see from looking at FIG. 2, one first accumulates 80 samples for the frame. This frame, which is frame n, is to be used for raw correlations. The correlations are then performed according to the algorithms indicated in FIG. 2, and one then computes the partial power for the preceding frame. Then, one computes the sum of the correlations and signal power over previous frames and also the total power over previous frames as shown. If one detects the suitable energy as exceeding the set threshold, one then adjusts the bit edge sample pointer and controls the clock to start the TRANSEC search which is the frame search. This is all clearly depicted in FIG. 1 and FIG. 2 as described above.

Hence, each raw correlator output is obtained by processing 80 input samples. The values "ISUM" and "QSUM" are the sums of the 'n' most recent raw I and Q correlator outputs. FIG. 2 (Initial Bit Sync Search) assumes new samples are being accumulated in frame 'n' while processing data from frame 'n−1'. Note there is a new energy estimate every millisecond. The energy estimates are:

$$E(n-1)=ISUM^2(n-1)+QSUM^2(n-1).$$

After an energy estimate exceeds the relative threshold, subsequent estimates may increase, stay the same, or decrease. If the energy decreases, it has 'peaked' (e.g. in frame 'n−2) and the position of the peak is noted and the phase error calculated. If the energy exceeds the previous value, the new estimate becomes the reference energy value. However, if the energy exceeds the threshold for 5 energy estimates (i.e. 5 ms) without peaking, the last energy estimate is considered a peak value and the phase error is calculated.

This entire correlation and threshold procedure is briefly highlighted in the following summary.

The first operation indicated above is the local correlation and compression operation which looks at the 80 raw input samples, for the current frame, and then compresses the input into three values:

1) The raw in-phase correlation,
2) The raw quadrature correlation, and
3) The partial power.

The receiver sample rate is 80 KS/s, and the phasing component duration is 16 msec of an 8 KHz sinusoid. Within the phasing component, using the existing 1 msec frame basis, each frame has 8 cycles of phasing with 80 data samples. The algorithm calculates the 1 msec. raw in-phase (I) and quadrature (Q) correlations. (If data is X, the processor computes the dot products X•I and X•Q.) In addition to the correlations of the data with the I and Q reference sinusoids, the BBP (base band processor) also computes the sum of the squares of the 80 data samples, X•X.

Next, the overall correlation and decision operation is described. This process generates the 8 KHz power and the total power over the last M frames and decides whether or not to have a 8 KHz detection. First, the processor sums the raw I and Q correlations for the previous M frames to form $I_{SUM}$ and $Q_{SUM}$ which are the inphase and quadrature correlation over the last M frames. Next, the sum of the squares of $I_{SUM}$ and $Q_{SUM}$ is formed to produce the signal power, SIGPWR, which represents the 8 KHz power in the last M frames. The processor also sums up the partial powers for the last M frames to form the total power. The signal power is compared to the total power. If the signal power is above the minimum power threshold and if the signal power has the required percentage of total power, then an 8 KHz detection is declared. The total Xsu does not have to be squared to obtain power, since the value of the raw 1 msec partial power (X•X) and the value $X_{SUM}$ already represent power. The raw I and Q correlations, as well as $I_{SUM}$ and $Q_{SUM}$ represent scaled voltages, since the references with which the data were correlated are fixed.

Following phasing detection, jam synchronization or phase correction processes follows. Phase correction consists of two steps; calculation of the bit phase error and adjustment of the phase by movement of the sample pointer and subsequent adjustments of the rubber clock. These adjustments are depicted in FIG. 3 entitled "Initial Search State Rubber Clock Adjust Process".

Figure 3:
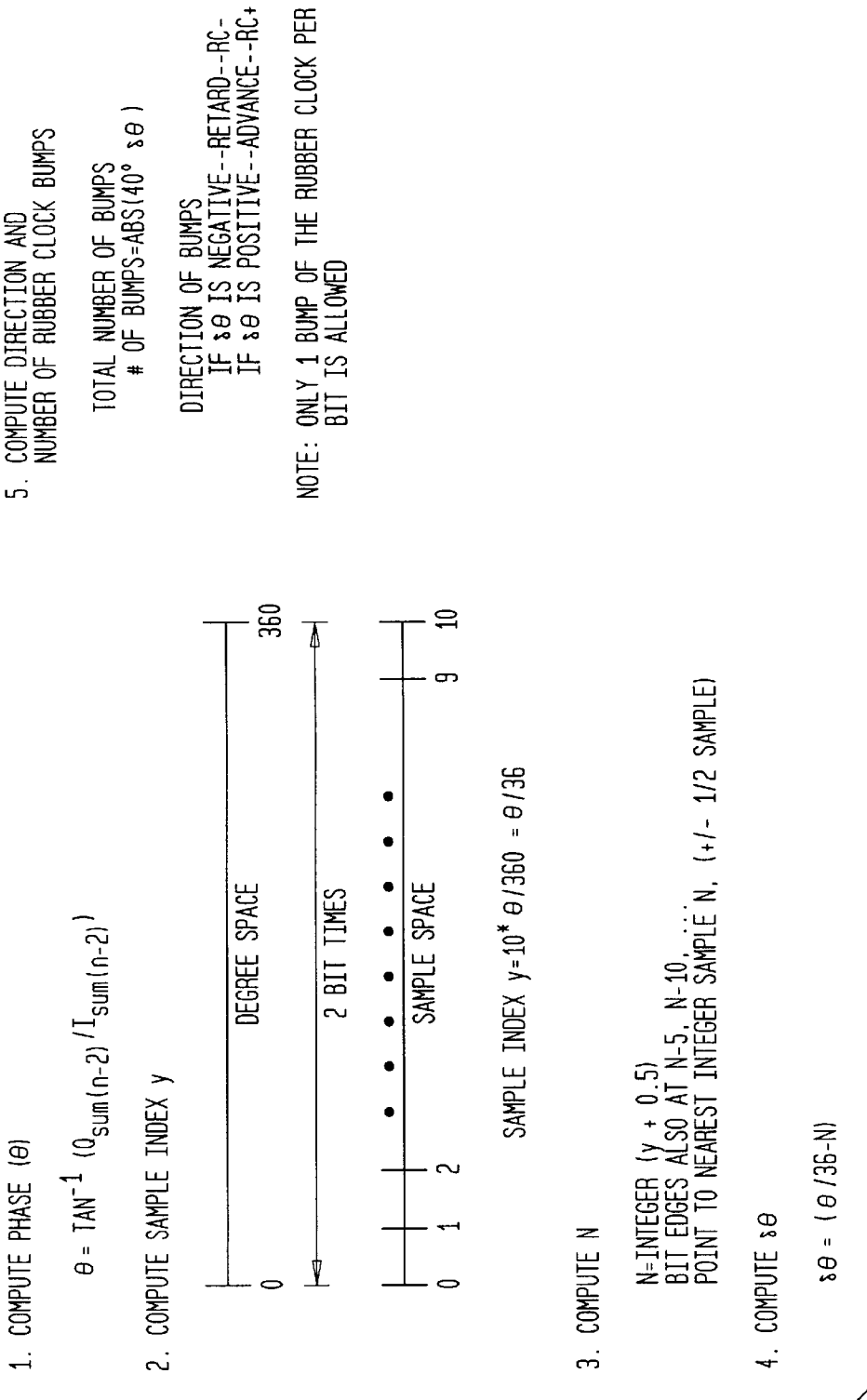
FIG. 3 is a chart depicting the adjustment process used to control the system clock.

As shown in FIG. 3 the steps for adjusting the clock which will be explained first include the step of computing the phase which is designated as step number 1. The second step is to compute the sample index. This is explained in the text by having a pointer move to a point to the sample closest to the bit edge. It is of course a desire to sample each bit in the absolute center of the bit which is the place or position of maximum energy. In step 3 the nearest sample 'n' is computed which corresponds to the most optimum position for the bit. Then, after the nearest sample is computed then one computes the phase estimate (Step 4) and then can determine and compute the direction of how the clock is to be varied. The clock is designated as a rubber clock because of the fact that it is variable and can be controlled.

The calculation for the bit phase error is:

$$\theta(n-2)=ARCTAN(QSUM(N-2)/ISUM(n-2)); \text{ (i.e. } E(n-2) \text{ at peak)}$$

A single 8 KHz cycle has a period of (1/8000) sec. or 10 samples (@80 KS/sec). Based on the bit phase error, a pointer is moved to point to the sample closest to the bit edge. After moving the sample pointer, the resultant position error is less than or equal to one half of a sample. (The bit edge can't be further than one-half sample away from the nearest sample.) With phase errors θ in the range (0,2π), which correspond to samples 0 through 10, the nearest sample, N, is:

$$N=\text{INTEGER}[5*\theta/\Pi)+0.5].$$

For example, with a phase estimate of $(7*\pi)/4$, the nearest sample is: INTEGER [35/4)+0.5]=9. The nearest samples to previous bit edges are at N-5=4, N-10=1, etc. The referencing algorithm subtracts 5 from the nearest integer sample value until this number is negative so the pointer points to past data.

With the example phase estimate of $(7*\pi)/4$, or 315°, the resultant fractional sample error after moving the pointer to sample '9' is:

$$\delta\theta(\text{samples})=(\theta(\text{degrees})/36)\div N=(315/36)-9=-0.25 \text{ samples}$$

The fractional sample error is adjusted by 'bumping' the rubber clock (Step 5) for multiples of the nominal 3.84 MHz clock period. Since there are 240 3.84 MHz clock pulses per bit, the phase granularity is 1/240th of a bit. The residual phase error with optimum clock adjustment is 1/480th of a bit. The number of 3.84 MHz clock pulses per sample is 240.5=48. The maximum clock advance or delay needed when pointing to the 'nearest' sample is therefore 24 'bumps'. As shown in FIG. 3, the number of 'bumps' is ±48*δθ9samples). In the above example, it takes −0.25*48=12 clock delays to align the data. Note that the maximum clock adjustment rate is (±) one pulse per bit.

The TRANSEC pattern search starts with the newly acquired bit sync using a stored prior history. A reasonable size for the stored history is 48 bits or 240 samples. This allows for the possibility that the initial bit sync search may have overlapped the TRANSEC pattern. Since the system is in bit sync, the early tracking function is also started. The TRANSEC frame search state sequence as shown by module 12 of FIG. 1 is shown in 4A.

The system now tracks bit sync with an incoming random data pattern. To track, histograms of data transition positions are generated periodically. The histograms are updated at the tracking loop rate and processed to produce a phase error metric. Recall that for 16 Kb/sec data and a 80 KS/sec sampling rate, there are 5 samples per bit. Each data bit period is partitioned into 20 bins with 4 bins between samples.

The properties of the ideal alignment are the following:

| | |
|---|---|
| BIT EDGE | TO LEFT OF BIN 10 |
| SAMPLE 3 | LEFT EDGE OF BIN 12 |
| SAMPLE 4 | LEFT EDGE OF BIN 16 |
| SAMPLE 0 | LEFT EDGE OF BIN 0 |
| SAMPLE 1 | LEFT EDGE OF BIN 4 |
| SAMPLE 2 | LEFT EDGE OF BIN 8 |
| BIT EDGE | TO RIGHT OF BIN 9 |

Figure 4B:
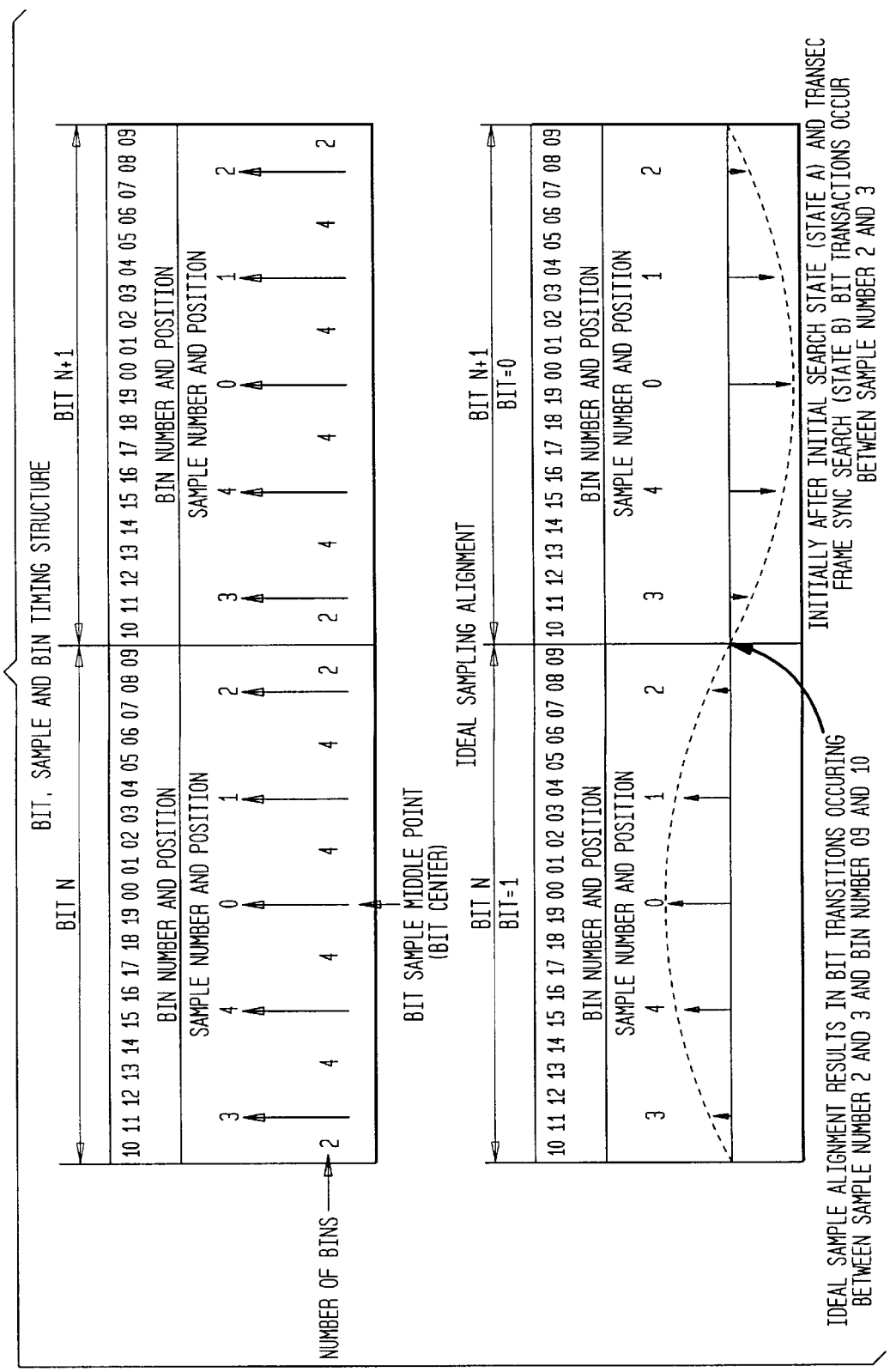
FIG. 4B shows an example of a bit, sample, bin indexing and alignment concept.

FIG. 4B illustrates the ideal alignment of bit samples and bins with the bit transition at the rightmost edge of Bin 9. Data bits are sampled at sample 0 which is at the left edge of Bin 0.

Figure 5:
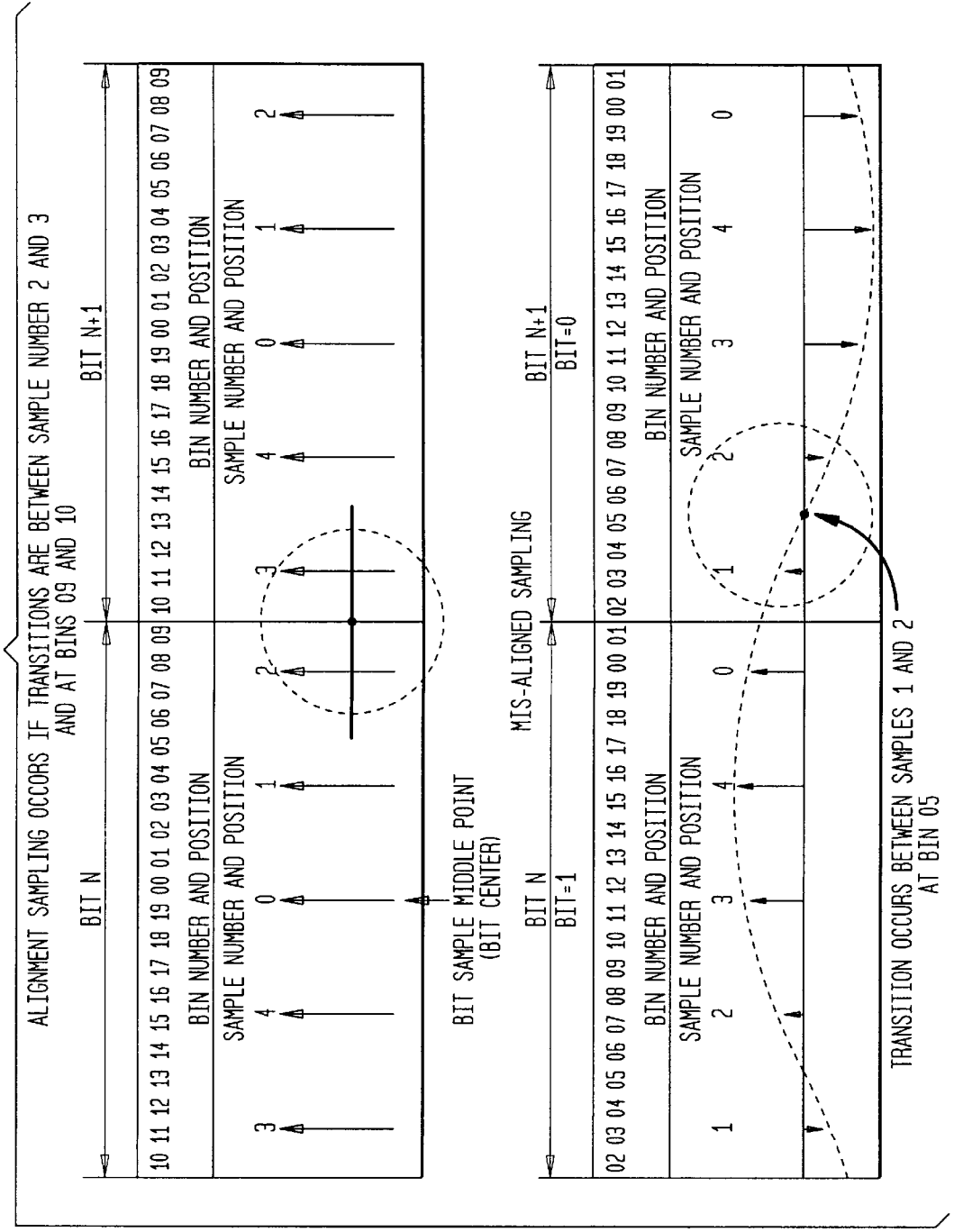
FIG. 5 is a diagram useful for showing a sampling out of alignment.
Figure 6:
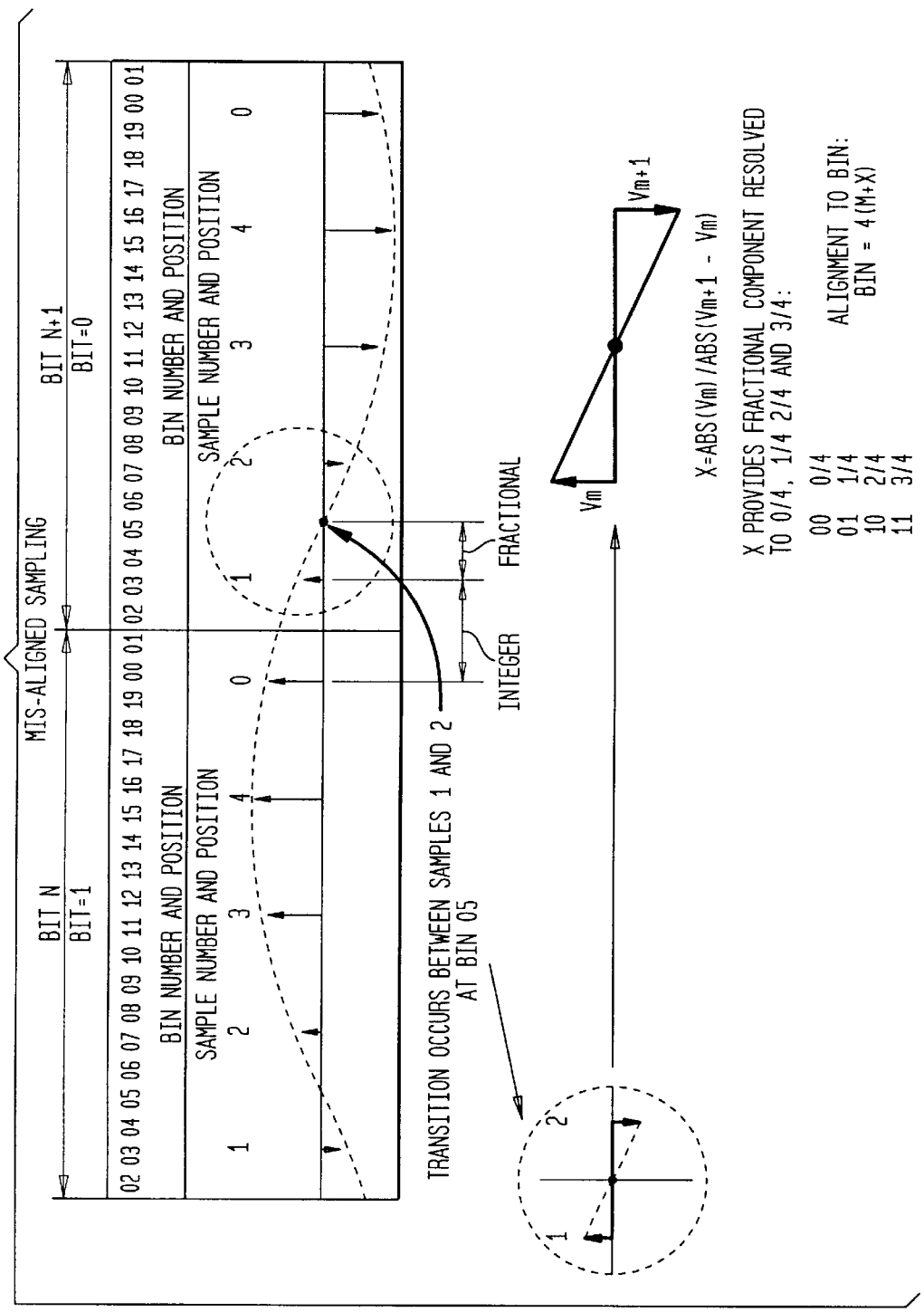
FIG. 6 is a diagram useful in showing sample alignment correction.

The concept of sampling misaligned data, and the calculations of transition interpolation, and bin assignment used for histogram generation are shown in FIGS. 5 and 6.

The following procedure. is used to generate histograms and supply bit edge error measurements to the tracking loop:

1. Collect 160 samples in a 2 msec frame.
2. Look for sign changes (transitions) between samples.
3. If there are sign changes, perform linear interpolation to find fractional sample position.
4. For each transition, calculate the bin number and increment its associated bin counter for form histogram.
5. Apply weighting curve to find phase error metric.
6. Compare group histogram difference of bins near bit edge to bins near bit center to the threshold as input to the fade detection/signal detection betting circuit.

Interpolations between samples are calculated via a 2 cycle divide, with results of 0, ¼, 2/4 or ¾ of a sample. This is equivalent to 0, 1, 2 or 3 bins. The fractional sample position, x, is then obtained by linear interpolation of two adjacent sample values (with opposite signs).

$$x=|v(m)|/|v(m+1)-v(m)|; (v(m), v(m+1) \text{ are sample values})$$

If M is the sample number prior to a data transition, (samples 0 to 4), and x is the fractional sample position, then the bin number, N, is:

$$N\text{-}4(M+x); (N\text{-}0 \text{ to } 19)$$

For example, if the sample just prior to a transition were sample 1 and the fractional position x equalled ¾, the Bin number N is:

$$N\text{-}4*(1+¾)=7.$$

After each transition position and its related bin number are calculated, the appropriate bin counter is incremented. For random data, the expected total of counts (transitions) in each histogram is about half the number of bits in a frame. If the frame (histogram) rate is 500 Hz, new histograms are generated every 2 msec. In a 2 msec frame, there are 32 bits, a total of 160 samples and an expected 16 data transitions.

The output of histogram processing is a phase error metric which is the input to the tracking loop. The tracking loop output is a rubber clock command which tries to keep the sampling point at the center of each bit. The phase error estimate is obtained by applying the following (or similar) weighting curve to the histogram. The weighting characteristic is reduced at the edges to prevent a few transitions with large weighting factors from disturbing the error measurement.

Figure 7:
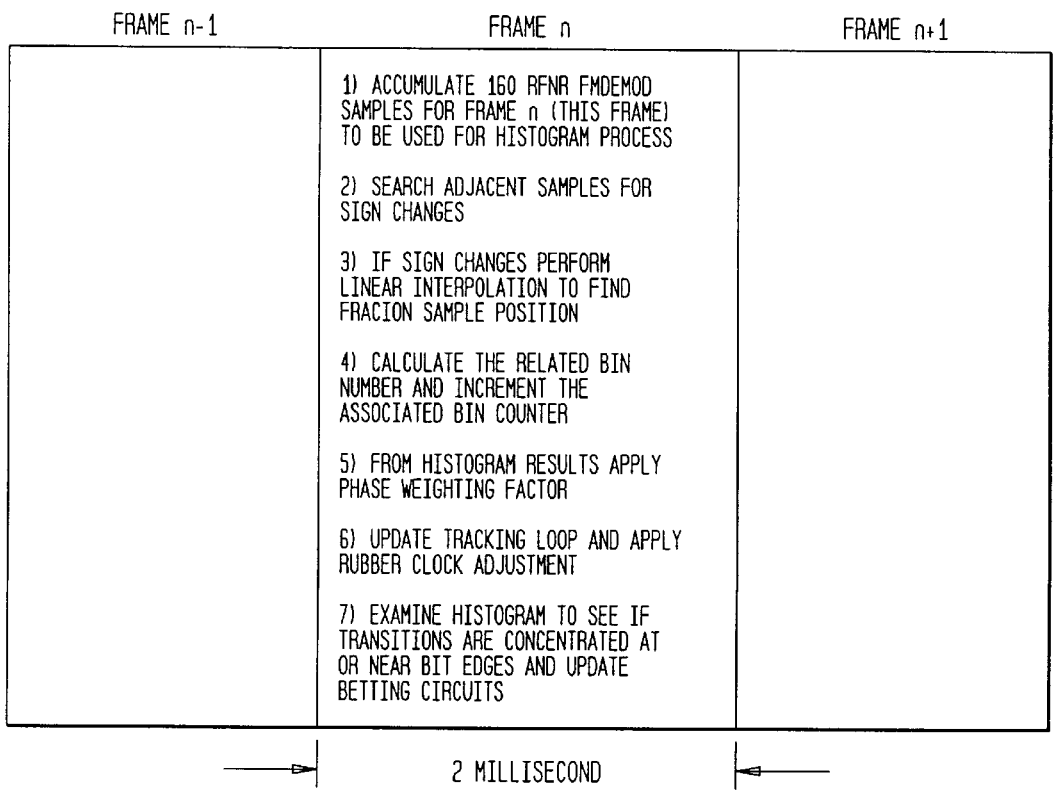
FIG. 7 is a diagram depicting the process employed for the generation of histograms.

FIG. 7 shows the process for providing and developing the histogram. A histogram is a representation of a distribution function where a plurality of values is divided and placed in bins or placed at intervals. Technically, it is a graphical representation of a distribution function by means of rectangles whose widths represent intervals into which the range of observed values is divided and whose heights or amplitudes represent the number of observations occurring each interval. Thus, the weighting number represents the height or amplitude and the bin represents the interval.

| BIN NO. | WEIGHTING | BIN NO. | WEIGHTING |
|---|---|---|---|
| 0 | −1 | 10 | 1 |
| 1 | −5 | 11 | 3 |
| 2 | −9 | 12 | 5 |

-continued

| BIN NO. | WEIGHTING | BIN NO. | WEIGHTING |
|---|---|---|---|
| 3 | −13 | 13 | 7 |
| 4 | −11 | 14 | 9 |
| 5 | −9 | 15 | 11 |
| 6 | −7 | 16 | 13 |
| 7 | −5 | 17 | 9 |
| 8 | −3 | 18 | 5 |
| 9 | −1 | 19 | 1 |

Consider the following example histogram:

| BIN NO. | COUNT | BIN NO. | COUNT |
|---|---|---|---|
| 0 | 0 | 10 | 3 |
| 1 | 0 | 11 | 2 |
| 2 | 0 | 12 | 6 |
| 3 | 1 | 13 | 2 |
| 4 | 0 | 14 | 1 |
| 5 | 2 | 15 | 0 |
| 6 | 1 | 16 | 0 |
| 7 | 0 | 17 | 1 |
| 8 | 0 | 18 | 0 |
| 9 | 1 | 19 | 0 |

The phase error metric is the sum of the products of the bin count and the bin weights. In this example, that sum is (71−39) or 32. This number, by itself, is not used to point to bin number 11 or 12 in the above example. (It is, however, proportional to the distance of the edge from the center, if one divides by the number of counts and the slope of the weighting curve.) The sample value '32' is the input to the tracking loop. The goal of the tracking loop is to drive the weighted bin error to zero.

Figure 8:
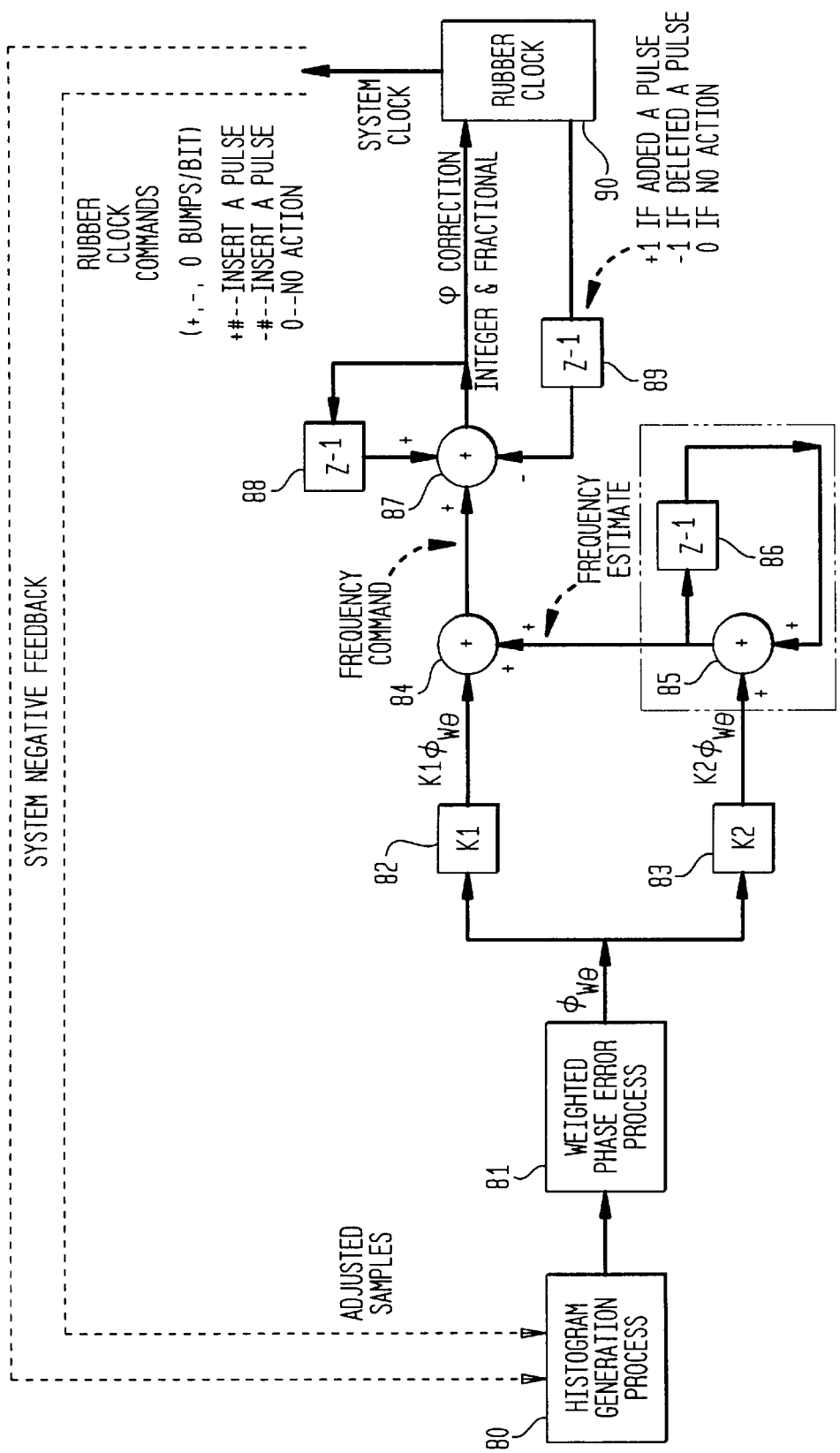
FIG. 8 is a block diagram depicting the tracking loop for controlling the system clock.

The second order tracking loop, shown in FIG. 8, is a control system that is fed a sequence of weighted bin errors. It, in turn, generates phase corrections that drive a rubber clock in the direction that will tend to minimize a function of the weighted bin error. The response time of the loop is a function of the gain parameters $K_1$ and $K_2$. Note that the loop is closed through the system because the rubber clock drive the A/D sampling clock which in turn realigns the sample positions.

Referring to FIG. 8, there is shown a histogram generation process designated by the reference number 80. This can be implemented by a digital signal processor or a microprocessor and involves the above described operation. The output from the histogram process is directed to module 81 designated as a weighted phase error process. As explained above, the phase error is the sum of the products of bin counts in regard to the histogram. This error is then applied to a first and a second data bin each having amplifiers or gain parameters designated as 82 and 83. Each of the parameters are then provided to respective adders as 84 and 85 where a frequency estimate is derived through adder 85 using a digital filter 86 to derive a frequency estimate at the output of adder 85, which frequency estimate is directed to adder 84 to produce a frequency command to adder 87 associated with digital filters 88 and 89. The output of adder 87 is the correction integer which is directed to the rubber clock module 90. The rubber clock module is a clock circuit which is controlled by means of a variable reactance device such as a variable reactance inductor and is capable of having the clock frequency shifted by or otherwise changed. One can do this by adding pulses or deleting pulses, or can actually vary the frequency of such a rubber clock. The output of the clock 90 is directed to the receiver system for enabling one to process the data, as for example for sampling each of the digital bits at the center. The output of the clock 90 is also directed back to the histogram generation process to provide that with adjusted samples so that synchronization is maintained. The system maintains the tracking state until either an end of message (EOM) is detected, there are RS failures or there is a detection of signal loss. As shown in FIG. 1, if there is a detected EOM or there are RS KI (Reed Solomon Key Indicator) failures or Packet RS ECB (error control block) failures, the system returns to the initial search state. If a signal loss is detected, then the FADE state is entered.

The histograms that were used for tracking are also used to detect signal drop-out or fades. They are also used to return from a brief fade. The decision to enter or return from the fade state is based on a signal loss 'betting' circuit.

The following assumes that a group of adjacent histograms is used directly as an input to the betting circuit. This histogram group is in the form of a single histogram, except that the counts in a given bin of the group histogram is the sum of all the histogram counts for that bin in the individual histograms of the group.

After a successful TRANSEC frame sync search, i.e. when a start of message (SOM) is detected, the betting circuit count is set to an initial value, e.g.3. After each histogram has been generated, the number of transitions from the inner 8 bins (Bins 6 through 13) is subtracted from the number of transitions in the 8 bins near the nominal sample position (Bins 0 to 4 and Bins 16 to 19). This difference is compared to a threshold. If this difference is greater than the threshold, then a signal present indication condition exist. If this difference is less than or equal to the threshold, then a signal absent indication condition exist. The threshold is the larger of a given fraction of the total number of counts in the group histogram and some minimum threshold number.

Data continues to be detected and processed until the process return to the initial search state. If a signal is indicated, one is added to the betting circuit count. If no signal is indicated, one is subtracted from the betting circuit. If the count is incremented above the maximum value, (e.g.6), then the count is returned to the maximum value. If the count decrements to ZERO, a FADE is declared and a fade timer is started. While in a FADE, betting circuit calculations continue. If the count is decremented to a negative value, then the count is returned to zero.

During a FADE, the tracking loop is frozen, that is, it continues to predict bit sync for the duration of the fade, but no further weighted histogram corrections are input to the loop.

While in a FADE, if the betting circuit count reaches the signal detection threshold value (e.g.4), then the system returns to the normal tracking state (State C of FIG. 1) and resumes sending weighted histogram corrections to the bit tracking loop. If the betting circuit count reaches the maximum value, then the FADE is declared over and the loop will need a new FADE longer than the maximum permissible FADE to cause a return to the search state.

Upon exceeding the time of a permissible FADE, the FADE state is terminated and the system returns to the Initial Search State.

Figure 9:
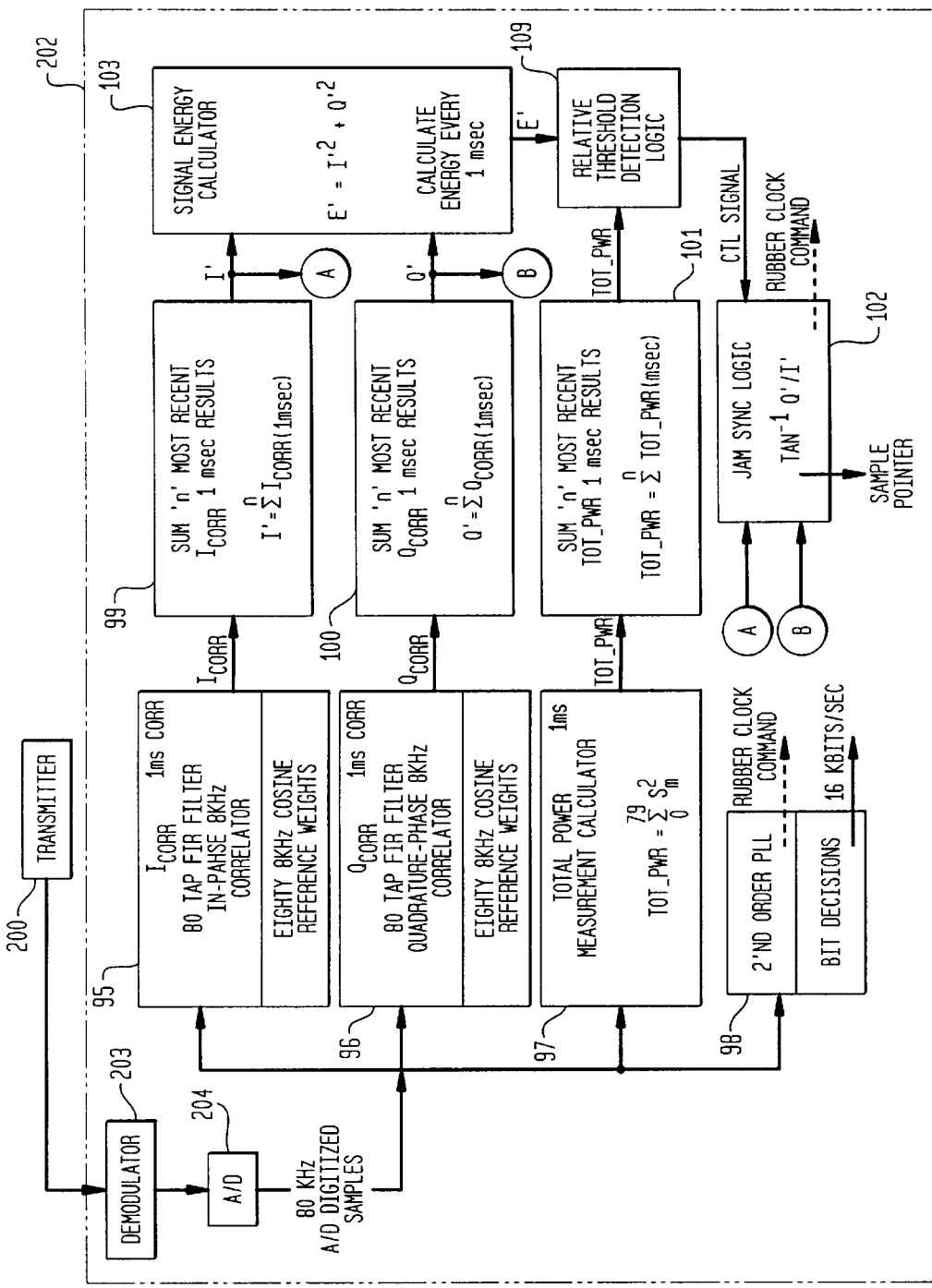
FIG. 9 is a block diagram depicting the I and Q Acquisition/Synchronization Logic and the Phase Lock Loop (PLL) Tracker.

Referring to FIG. 9 there is shown a block diagram of the I & Q Acquisition/Synchronization Logic and the Phase Lock Loop (PLL) Tracker System. The input to the system consists of the 80 KHz digitized samples. As is well known in digital receivers, the signal is a2A received a2B and is demodulated a2C with the analog signal being coupled to an analog to digital converter reference number 204 to produce digital samples at the 80 KHz bit rate. These samples are applied respectively to an I correlator 95 and a Q correlator 96 to produce at the output the I and Q correlated signals as above described. The input signal is further applied to a Total Power Measurement Calculator at which operates according to the summation algorithm shown within module 97. Techniques for calculating the total power of an incoming signal are well known. The output of module 97 is applied to module 101 which implements a Summation Algorithm whereby the most recent total power results over a 1 msec interval is calculated. This is calculated and applied to the threshold detection logic 104 which makes a decision as to whether the power is suitable to enable one to perform the above described steps. As indicated, the output of the I correlator is directed to the input of a Summer or Sum Circuit 99 where the most recent I correlated results are summed as indicated. In a similar manner, the output of the Q correlator is directed to the input of a Sum Circuit 100 where the Q correlated signals over a 1 msec interval are summed. The outputs of modules 99 and 100 apply to the Signal Energy Calculator module 103 which calculates the energy every 1 msec. The output of the Signal Energy Calculator 103 is directed to the input of the Threshold Detection Logic circuit 104 which compares the calculated energy with the total power to determine whether or not sync detection can be implemented. It is also seen that the output of Summer 99 and Summer 100 are directed to the inputs of a module 102 indicated Jam Sync Logic. The module 102 receives the inputs from the I and Q correlators designated as A and B and uses those inputs to control the rubber clock. The rubber clock is typically a digital counter consisting of an adequate number of stages which operates in conjunction with a phase lock loop or PLL 98. The rubber clock provides a signal at 16 KBITS/sec and depending upon the calculations the Jam Sync Logic 102 can insert bits as ones or zeroes into the clock or delete bits. The operation of rubber clocks and digital clocks operative to receive bits for changing or altering the frequency and phase of the clock is well known. As indicated in FIG. 9, this is a diagram of the acquisition and synchronization logic as controlling the phase lock loop.

While specific circuit implementations have not been shown, it is indicated that one skilled in the art would have no difficulty in implementing the digital circuitry required to produce the above described functions. Such digital circuitry is available in modules designated as digital signal processor modules or DSP's. These modules contain suitable circuitry to implement the above described functions including correlation and clock operation as well as summation and energy calculations.

What is claimed is:

1. A method of maintaining bit synchronization with a received digital signal in a receiver of a digital communication system, the method comprising the steps of:
   (a) periodically sampling data bits of the digital signal to acquire a sequence of digital sample values;
   (b) determining data bit transition times of the digital signal from the digital sample values;
   (c) forming a histogram of data bit transition times;
   (d) calculating a phase error metric as a function of the histogram; and
   (e) using the phase error metric to adjust a timing reference of the receiver to synchronize the periodic sampling with the data bits of the digital signal.

2. The method of claim 1; wherein step (b) includes determining data bit transition times of the digital signal by identifying adjacent digital sample values with opposite signs.

3. The method of claim 2, wherein step (b) further includes interpolating the adjacent digital sample values to determine the data bit transition times.

4. The method of claim 1, wherein step (c) includes forming the histogram by:
   (c1) dividing each data bit period into a plurality of time interval bins, each time interval bin having a corresponding bin counter for accumulating a histogram count for the time interval bin;
   (c2) associating each of the data bit transition times with one of the time interval bins; and
   (c3) for each data bit transition time associated with a time interval bin, incrementing the bin counter corresponding to the time interval bin.

5. The method of claim 1, wherein step (d) includes:
   (d1) applying a phase weighting factor to the histogram; and
   (d2) calculating the phase error metric as a sum of weighted histogram counts.

6. The method of claim 5, wherein step (e) includes
   (e1) applying the phase error metric to a tracking loop to generate a phase error correction; and
   (e2) adjusting a rubber clock in accordance with the phase error correction, the rubber clock driving a sampling clock, thereby time aligning sampling times with centers of the data bits.

7. The method of claim 1, wherein steps (c), (d) and (e) are performed periodically.

8. The method of claim 1, further comprising the step of:
   (f) detecting occurrences of a signal drop-out or fade of the digital signal at the receiver by applying histogram data to a signal loss betting circuit; and
   (g) entering a fade state when a signal drop-out or fade of the digital signal is detected.

9. The method of claim 8, further comprising the steps of:
   (h) while in the fade state, detecting a presence of the digital signal by applying the histogram data to the signal loss betting circuit; and
   (i) returning from the fade state to a tracking state when the presence of the digital signal is detected.

10. The method of claim 9, wherein step (g) includes suspending use of the phase error metric to adjust the timing reference, and step (i) includes resuming use of the phase error metric to adjust the timing reference.

11. A method of identifying a signal drop-out or fade of the digital signal received at a receiver of a digital communication system, the method comprising the steps of:
   (a) periodically sampling data bits of the digital signal to acquire a sequence of digital sample values;
   (b) determining data bit transition times of the digital signal from the digital sample values;
   (c) forming a histogram of data bit transition times;
   (d) detecting occurrences of a signal drop-out or fade of the digital signal at the receiver by applying histogram data to a signal loss betting circuit; and
   (e) entering a fade state when a signal drop-out or fade of the digital signal is detected.

12. The method of claim 11, further comprising the steps of:
   (f) while in the fade state, detecting a presence of the digital signal by applying the histogram data to the signal loss betting circuit;
   (g) returning from the fade state to a tracking state when the presence of the digital signal is detected; and (h) entering a signal search state when the presence of the digital signal is not detected after a predetermined period of time in the fade state.

13. The method of claim 12, further comprising the steps of:
   (i) in the tracking state, calculating a phase error metric as a function of the histogram and using the phase error metric to adjust a timing reference of the receiver to synchronize the periodic sampling with the data bits of the digital signal;
   wherein step (e) includes suspending use of the phase error metric to adjust the timing reference, and step (g) includes resuming use of the phase error metric to adjust the timing reference.

14. The method of claim 12, wherein step (c) is performed periodically to produce a sequence of histograms and, for each histogram, step (c) includes:
   (c1) dividing each data bit period into a plurality of time interval bins, each time interval bin having a corresponding bin counter for accumulating a histogram count for the time interval bin;
   (c2) associating each of the data bit transition times with one of the time interval bins; and
   (c3) for each data bit transition time associated with a time interval bin, incrementing the bin counter corresponding to the time interval bin, thereby generating a set of histogram counts indicating the timing of the data bit transition times relative to nominal bit transition times.

15. The method of claim 14, wherein:
   the time interval bins include inner bins in the vicinity of the nominal bit transition times and outer bins in the vicinity of the center of each data bit period;
   for each histogram, step (d) includes:
      (d1) computing a difference of a number of data bit transitions counted in the inner bins and a number of data bit transitions counted in the outer bins;
      (d2) comparing the difference to a threshold;
      (d3) incrementing or decrementing a fade counter for each histogram in accordance with a result of the comparison;
   step (e) includes entering the fade state when the fade counter reaches a first predetermined value; and
   step (g) includes returning from the fade state to the tracking state when the fade counter reaches a second predetermined value.

16. A digital communication system for maintaining bit synchronization with a transmitted digital signal, comprising:
   a transmitter configured to transmit a digital signal comprising data bits; and
   a receiver configured to receive and maintain bit synchronization with the digital signal, said receiver comprising:
   an adjustable clock that provides a timing reference;
   an analog-to-digital (A/D) converter that periodically samples data bits of the digital signal to acquire a sequence of digital sample values, said A/D converter being responsive to the timing reference of said adjustable clock to control a timing of the samples;
   a processor receiving the sequence of digital sample values and determining data bit transition times of the digital signal from the digital sample values, said processor forming a histogram of data bit transition times and calculating a phase error metric as a function of the histogram, said adjustable clock being responsive to the phase error metric to adjust the timing reference to synchronize the timing of the samples with the data bits of the digital signal.

17. The system of claim 16, wherein said processor determines data bit transition times of the digital signal by identifying adjacent digital sample values with opposite signs.

18. The system of claim 17, wherein said processor interpolates the adjacent digital sample values to determine the data bit transition times.

19. The system of claim 16, wherein said processor includes a plurality of bin counters for accumulating histogram counts, the bin counters respectively corresponding to time interval bins representing a set of time intervals within each data bit period, wherein for each of the data bit transition times, said processor associates the data bit transition time with one of the time interval bins and increments the bin counter corresponding to said one of the time interval bins.

20. The system of claim 16, wherein said processor calculates the phase error metric as a sum of weighted histogram counts.

21. The system of claim 20, wherein said receiver further comprises:
   a tracking loop responsive to the phase error metric to generate a phase error correction, said adjustable clock adjusting the timing reference in response to the phase error correction.

22. The system of claim 21, wherein said adjustable clock comprises a rubber clock, the receiver further comprising a sample clock for control the timing of the samples, said rubber clock driving the sampling clock in accordance with the phase error correction to time align the timing of the samples with centers of the data bits.

23. The system of claim 16, wherein said processor periodically generates a histogram and computes a phase error metric, said adjustable clock periodically adjusting the timing reference in response to the periodically computed phase error metric.

24. The system of claim 16, wherein said receiver further comprises:
   a signal loss betting circuit responsive to histogram data for determining whether the digital signal is present or whether a signal drop-out or fade of the digital signal has occurred, said receiver entering a fade state when said signal loss betting circuit detects a signal drop-out or fade of the digital signal, said receiver returning from the fade state to a tracking state when said signal loss betting circuit detects the presence of the digital signal.

25. The system of claim 24, said receiver suspends use of the phase error metric to adjust the timing reference while in the fade state, and resumes use of the phase error metric to adjust the timing reference when said receiver returns to the tracking state.

26. A digital communication system for identifying a signal drop-out or fade of a transmitted digital signal, comprising:
   a transmitter configured to transmit a digital signal comprising data bits; and
   a receiver configured to receive the digital signal, said receiver comprising:
   an analog-to-digital (A/D) converter that periodically samples data bits of the digital signal to acquire a sequence of digital sample values;
   a processor receiving the sequence of digital sample values and determining data bit transition times of the digital signal from the digital sample values, said processor forming a histogram of data bit transition times; and a signal loss betting circuit responsive to histogram data for detecting occurrences of a signal drop-out or fade of the digital signal, said receiver entering a fade state when said signal loss betting circuit detects a signal drop-out or fade of the digital signal.

27. The system of claim 26, wherein, while in the fade state, said signal loss betting circuit is responsive to the histogram data for detecting a presence of the digital signal, said receiver returning from the fade state to a tracking state when said signal loss betting circuit detects the presence of the digital signal, said receiver entering a signal search state when said signal loss betting circuit fails to detect the presence of the digital signal after a predetermined period of time in the fade state.

28. The system of claim 27, further comprising:

an adjustable clock that provides a timing reference, said A/D converter being responsive to the timing reference of said adjustable clock to control a timing of the samples, wherein, in the tracking state, said processor calculates a phase error metric as a function of the histogram, said adjustable clock being responsive to the phase error metric to adjust the timing reference to synchronize the timing of the samples with the data bits of the digital signal, and wherein, in the fade state, said receiver suspends use of the phase error metric to adjust the timing reference.

29. The system of claim 26, wherein said processor includes a plurality of bin counters for accumulating histogram counts, the bin counters respectively corresponding to time interval bins representing a set of time intervals within each data bit period, wherein for each of the data bit transition times, said processor associates the data bit transition time with one of the time interval bins and increments the bin counter corresponding to said one of the time interval bins, thereby generating a set of histogram counts indicating the timing of the data bit transition times relative to nominal bit transition times, said processor periodically generating a histogram to produce a sequence of histograms.

30. The system of claim 29, wherein:

the time interval bins include inner bins in the vicinity of the nominal bit transition times and outer bins in the vicinity of the center of each data bit period;

for each histogram, said signal loss betting circuit computes a difference of a number of data bit transitions counted in the inner bins and a number of data bit transitions counted in the outer bins;

said signal loss betting circuit comprising a fade counter that is incremented or decremented for each histogram in accordance with a comparison of the difference to a threshold;

said receiver enters the fade state when the fade counter reaches a first predetermined value; and said receiver returns from the fade state to the tracking state when the fade counter reaches a second predetermined value.

* * * * *